(12) United States Patent
Vier

(10) Patent No.: US 8,502,800 B1
(45) Date of Patent: Aug. 6, 2013

(54) METHOD FOR IMPROVING SENSITIVITY OF CAPACITIVE TOUCH SENSORS IN AN ELECTRONIC DEVICE

(75) Inventor: Bradford Edward Vier, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 1114 days.

(21) Appl. No.: 12/276,657

(22) Filed: Nov. 24, 2008

Related U.S. Application Data

(60) Provisional application No. 60/991,419, filed on Nov. 30, 2007.

(51) Int. Cl.
*G06F 3/045* (2006.01)

(52) U.S. Cl.
USPC ............................ 345/174; 345/173; 345/169

(58) Field of Classification Search
USPC .................. 345/173, 174, 184, 168, 169, 697
See application file for complete search history.

(56) References Cited

U.S. PATENT DOCUMENTS

| | | | |
|---|---|---|---|
| 6,825,833 B2 | 11/2004 | Mulligan et al. | |
| 6,961,049 B2 | 11/2005 | Mulligan et al. | |
| 7,106,307 B2 | 9/2006 | Cok | |
| 7,154,481 B2 | 12/2006 | Cross et al. | |
| 7,254,775 B2 | 8/2007 | Geaghan et al. | |
| 7,259,809 B2 | 8/2007 | Brandt et al. | |
| 8,004,536 B2 * | 8/2011 | Wilensky | 345/589 |
| 2002/0030666 A1 * | 3/2002 | Philipp | 345/168 |
| 2004/0008191 A1 * | 1/2004 | Poupyrev et al. | 345/184 |
| 2004/0183787 A1 * | 9/2004 | Geaghan et al. | 345/173 |
| 2006/0227114 A1 | 10/2006 | Geaghan et al. | |
| 2008/0042971 A1 * | 2/2008 | Sachs | 345/156 |
| 2008/0048990 A1 * | 2/2008 | Cho et al. | 345/173 |
| 2008/0100580 A1 * | 5/2008 | Han | 345/168 |
| 2008/0150905 A1 * | 6/2008 | Grivna et al. | 345/173 |
| 2008/0170046 A1 | 7/2008 | Rimon et al. | |
| 2009/0073136 A1 * | 3/2009 | Choi | 345/173 |
| 2009/0225107 A1 * | 9/2009 | Nose et al. | 345/697 |

* cited by examiner

*Primary Examiner* — Thuy Pardo

(74) *Attorney, Agent, or Firm* — Kevin L. Daffer; Daffer McDaniel, LLP

(57) ABSTRACT

An electronic device and method are disclosed that relate to the selection of a control algorithm for optimizing the performance of a device that is controlled by a user initiated touching of the device that creates a capacitive coupling. The device and method entail the use of a motion sensor to gather data related to the movement of the device, a means for analyzing the data to select an optimal control algorithm, and implementing the control algorithm.

17 Claims, 2 Drawing Sheets

METHOD FOR IMPROVING SENSITIVITY OF CAPACITIVE TOUCH SENSORS IN AN ELECTRONIC DEVICE

PRIORITY CLAIM

The present application claims priority to U.S. Provisional Patent Application No. 60/991,419 filed Nov. 30, 2007.

BACKGROUND OF THE INVENTION

1. Field of the Invention

This invention relates generally to electronic devices, and more particularly, to electronic devices containing accelerometers and capacitive touch sensors, wherein input from the accelerometers is used to select an improved sensitivity level at which the capacitive touch sensors operate, as well as a method for operating a device with such architecture.

2. Description of the Related Art

The following descriptions and examples are not admitted to be prior art by virtue of their inclusion within this section.

Capacitive touch sensors are increasing in popularity due to their performance advantages over resistive touch sensors. Unlike capacitive touch sensors, resistive touch sensors can deteriorate and become less dependable over time. This is because they require physical displacement and pressure on a plastic screen, which makes them susceptible to wear-out, corrosion and scratching. Capacitive touch sensors are less susceptible to these drawbacks, and have become a common alternative to resistive touch sensors. In particular, capacitive touch screens have a great deal of utility in particular applications, such as tablet computers and other portable electronic devices, because of their increased robustness, their ability to sense two or more simultaneous touches on different parts of a touch screen, and their ability to work better alongside a digitizer.

In its basic form, a capacitive touch sensor, such as a touch screen for an electronic device may comprise a layer of conductive coating (such as a thin-film conductive coating) on a glass substrate. The conductive coating is most commonly formed from indium tin oxide (ITO), but other transparent conductive oxides (TCOs), such as antimony tin oxide and zinc oxide may be used instead of ITO. The glass substrate may have an exterior coating that makes it more difficult to scratch and easier to clean than conventional touch screens, and may also function to seal the sensor electronics within the device.

The functionality of a capacitive touch screen is derived from circuits located along the edges of the screen that generate a uniform low-voltage electrical field over the conductive coating. When a person touches the screen with their finger, their finger will disrupt the electrical field. The disruption of the change in current flowing from each side of the touch screen can be measured, allowing the device to calculate the X and Y coordinates of the point on the screen the person touched.

Despite the rise in popularity of capacitive touch screens, these devices still suffer from some drawbacks. In particular, the touch screen devices tend to function well at a normal sensitivity levels when they are connected to either a power cord or the body of a user. The sensitivity level of a capacitive touch sensor refers generally to the device's ability to sense a touch. A device operating at low sensitivity is less likely to sense a touch than a device with high sensitivity. When a touch screen device is not in the hands of a user or connected via a power cord, it may need to operate at a heightened sensitivity level in order to accurately sense a user's touch. However, this heightened sensitivity level is accompanied by unwanted side effects. Accordingly, there is a need for managing the sensitivity level of a touch screen device to minimize the extent to which a user experiences the negative effects of operating at the heightened sensitivity level.

SUMMARY OF THE INVENTION

An electronic device is disclosed that is able to receive input from a user in the form of a user initiated touching of the device. The device comprises one or more sensors operable to collect data based on motion experienced by the device and to analyze the collected data and adjust the sensitivity of the device to the user initiated touching based on the data collected by the one or more sensors.

A method for selecting a control algorithm for a capacitive touch screen device is also disclosed. The method comprises making a determination of whether the device is held by human hands and implementing alternate control algorithms based on the determination of whether or not the device is being held by human hands or otherwise supported by a user.

BRIEF DESCRIPTION OF THE DRAWINGS

Other objects and advantages of the invention will become apparent upon reading the following detailed description and upon reference to the accompanying drawings in which.

Figure 1:
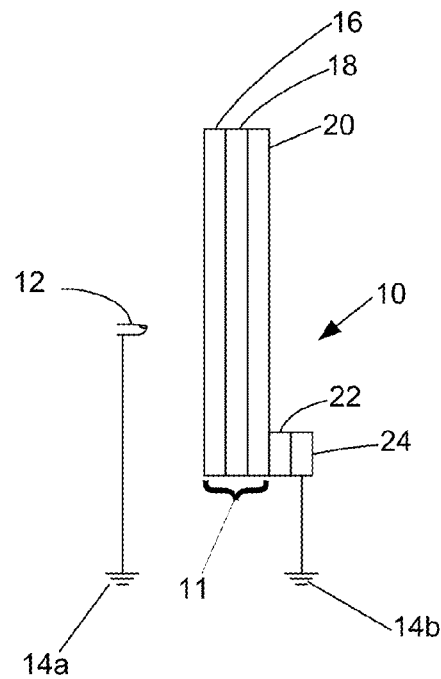
FIG. 1 is a schematic view showing an exemplary capacitive touch screen device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning to the drawings, FIG. 1 is a schematic view of an exemplary capacitive touch screen device 10. The components of the device 10 include a capacitive touch sensor 11. A typical capacitive touch sensor 11 includes a transparent conductive layer 18 laminated between a glass substrate 20 and an optional protective layer 16 that may serve to prevent scratching or reduce glare. The conductive layer 18 may be formed, for example, from a transparent conductive oxide (TCO) deposited on glass substrate 20 by sputtering or a similar fabrication process. The TCO conductive layer 18, which acts as a resistance or impedance element, may be substantially transparent and may have a terminal at each end or boundary of the touch screen 11. The conductive layer 18 will ideally have a surface of uniform resistivity. It is noted while the exemplary touch screen 11 utilizes a TCO conductive layer 18 and glass substrate 20, different types of materials, such as polymers, can also be used to form the aforementioned conductive layer 18 and substrate 20.

The exemplary device of FIG. 1 also includes a power source 24 and touch screen circuitry 22 that is electrically connected to the conductive layer 18. Here, the circuitry 22 functions to calculate the location of a capacitive coupling, or "touch" on the conductive layer 18. The circuitry 22 of the capacitive touch screen 11 may include a controller that functions to generate an excitation waveform to the conductive layer 18 of the sensor 11. This excitation waveform produces an electric field in the conductive layer 18 so that it may "sense" a touch. When the conductive layer 18 is touched or nearly touched by a user's finger 12, a change or modulation in the electric field can be detected as a result of capacitive coupling between the user's finger 12 and conductive layer 18. In other words, a "touch," insofar as the device 10 is concerned, is a capacitive coupling between the user's finger 12 and the conductive layer 18 of the capacitive sensor 11 that may occur, for example, when a user's finger is brought within approximately one millimeter of the capacitive touch screen. The change or modulation in the electric field associated with the capacitive coupling is used to generate a signal for identifying the location of the touch with respect to the touch screen 11. Here, the controller senses the change in the electric field and translates the sensed change into a set of X and Y coordinates. The X and Y coordinates gathered by the controller are then communicated to the electronic device as user input.

Alternative formations of capacitive touch screens may include a transparent rigid substrate 20, which can be glass, or a polymer, such as an acrylic or plastic material. An alternative formation may be formed by creating a transparent conductive or semi-conductive layer 18 on a surface of a substrate 20 from an ITO or a similar substance. A pattern of electrodes may then be created on the substrate 20 by establishing an additional conductive coatings or electrodes over portions of the transparent conductive layer 18. One or more protective film layers 16 may also be included over the exterior surface of the transparent conductive layer, and the touch screen 11 may be sealed along its perimeter. To shield the touch screen from backside interference, the touch screen may also include a second transparent conductive coating applied to the rear surface of the substrate. A backside shield may be crafted from a high resistance ITO (or similar substance).

An alternative to forming the touch screen sensor by including a conductive layer over the entire surface of the substrate may be to include sensor bars instead. The sensor bars may be formed by masking portions of the substrate and depositing a conductive layer or film similar to the TCO layers discussed above. Generally, conductive materials that will not react with other materials of the touch screen are suitable, such as a TCO where a transparent sensor bar is required. The quantity of sensor bars in a touch screen may vary according to the intended use of the touch screen. Fabrication of the sensor bars may be accomplished by applying a TCO to a dielectric layer, applying a mask layer, and etching away the unwanted areas of the TCO. The sensor bars may also be on a separate substrate, and subsequently adhered to a dielectric backing Another method for forming the sensor bars may involve depositing a pattern of TCO material on a dielectric layer, then bonding the sensor bar to a support substrate with an optical adhesive. When sensor bars are used to form the sensor layer, multiple sensor bars may extend over the surface of the touch screen. The sensor bars may be arranged parallel to each other, and have resistance characteristics that vary linearly over their length. In operation, an excitation waveform may be applied to the sensor bars to create an electric field. Touching the bars should cause a distortion in the electric field which may be communicated to touch sensing circuitry through lead lines connected to the sensor bars to determine the location of the touch. In some cases, the touch screen may also include a protective layer or layers that can be individually removed and replaced to protect the touch screen in higher wear environments.

For the purposes of the continuing disclosure, a rectangular touch screen and corresponding conductive layer, or resistance unit, is assumed. Returning to the structure of a capacitive touch screen, the basic ingredients of the touch screen may include four terminals, a resistive coupling network, an oscillator that varies the potential of the terminals with respect to ground, current-sensing circuitry to measure the current through each terminal, and normalizing circuitry to produce an output signal related to the location of the touch. The current-sensing circuitry may function to measure the current and current ratios and use the measured data to determine the X and Y coordinates touches on the screen. Further, while the capacitive touch screen will typically be activated by a person's finger, it may also be activated by any object that forms a capacitive coupling with the resistance element. For instance, the capacitive coupling may also be accomplished using a conductive structure that is connected to ground, such as a stylus connected to a ground wire. Where a finger is used to activate the touch screen, the finger creates a capacitive coupling with the conductive layer of the touch screen when it gets close enough to the touch screen to provide a path to ground. Like the user's body, the current sensing circuitry may also be connected to an earth ground via the exterior surface of the computer or through a docking station or power cord connected to a power source and ground, such as a wall outlet. Generally, these low impedance paths to a ground via a wire or other conductor are referred to as "hard grounds." Like a power cord connected to a grounded wall outlet, the path to ground that flows through a user's body is also considered a relatively high quality path to ground.

When a user's finger is in contact with the conductive layer of the touch screen or brought near enough to the touch screen to register capacitive coupling, a relatively low impedance path to ground is provided, a small amount of current flows through the user's body, and the oscillator signal is affected. The fraction of the current that flows through an edge boundary can be used to calculate the location of the touch because the ratio of current that flows through the boundary is inversely proportional to the distance from the boundary of the point touched. The current ratio is also directly proportional to the distance from an opposite boundary. Thus, the sensing circuitry produces an output voltage based on the current ratio that corresponds to a location along one axis of the screen. This calculation may be performed along both axes of the screen to determine the X and Y coordinates of the touch. Accordingly, a location signal can be generated to the touch screen device to indicate that the screen is being touched as well as the location of the touch.

The sensitivity of the circuit may be selected by a controller so that when a finger touches the surface of a protective layer, the sensor layer and circuitry will accurately sense the touch location. In general, the sensitivity is increased by reducing the amount of electronic noise that is filtered by the sensor circuitry during operation. At the optimum sensitivity level, only physical touches will cause the sensing circuitry to generate a signal. If the sensitivity level is too low, then touch signal may not propagate because the signal will be filtered off as noise by the circuit. Conversely, if the sensitivity level is too high, then the sensing circuitry may generate false touch signals in response to electrical noise from the system or external sources instead of generating accurate touch signals in response to actual touches by the user. Typically, the sensitivity level of the capacitive touch sensor is controlled through firmware stored within the device.

Despite their improved reliability and rising popularity, capacitive touch-screens still suffer from some drawbacks. One such drawback relates to the signal processing that must occur for a capacitive touch screen to function. Generally, electronic devices containing capacitive touch screens have been observed to function more reliably when held by a user or connected directly to a ground. Here, the body of a user may provide an effective ground path because it is operating as an electronic device when the user touches the screen, thereby creating a capacitive coupling between their body and the touch screen. In any case, both the touch screen electronic device and user are connected to an earth ground. The user is connected to the ground that he or she stands on, and the device's path to ground may vary between the body of the user when the user is holding the device; a power cord that is connected to a grounded wall outlet; and a more convoluted path to ground through the device's supporting structure. This path to ground through the device's supporting structure may flow through rubber bumpers on the bottom of the device as well as a table or similar object on which the device rests. This difference in ground paths has been observed to adversely affect the sensitivity of the touch screen when the device is not in physical contact with the user or connected to a ground path via a power cord. A method for optimizing the sensitivity of the touch screen depending on whether or not it is in physical contact with a user or connected to a power source through a power cord is provided herein.

The default mode of operation and sensitivity level for capacitive touch screen devices is based on the availability of a higher quality ground path in the form of either a connection to a wall outlet or a connection to a person holding the device. When the device is grounded through the body of a user or through a power outlet, it can easily sense the differences in capacitance between the ambient air and a human hand, stylus, or similar object at the default sensitivity level. In other words, the default sensitivity level is optimal for detecting the capacitive coupling that occurs when a person touches the screen if the user is holding the device or the device is connected to an outlet or similar path to ground. However, capacitive touch screen devices that have a lower quality path to ground have been observed to less effectively detect touches when operating at the default sensitivity level. In short, two relatively conductive higher quality ground paths may be available to a device: either a ground path available through a power line or a ground path available through the housing of the device, through the user, to an earth ground. A capacitive touch screen device that is not connected to a relatively highly conductive path to ground, for example a portable computer resting on a table rather than in a person's hands, must operate at a higher sensitivity level to detect the touch because of the less conductive ground path. It follows that the sensitivity algorithm executed by the firmware stored on the touch screen control circuitry must be adjusted to bring about an increase in the sensitivity level of the device when it is not connected to a higher quality path to ground.

Unfortunately, while increasing the sensitivity level by adjusting the device's firmware allows the touch screen to work more properly when not enjoying a higher quality ground path, it may bring other problems into play. As noted above, the sensitivity of the capacitive touch screen may be adjusted by increasing or decreasing the amount of electrical noise that is filtered from the signal path. If less noise is filtered from the touch sensing circuitry, then electrical noise from both inside and outside of the device may be more likely to generate a false signal when the sensor is functioning at a higher sensitivity level. Accordingly, false input may be more likely to be detected when the touch screen is operated with increased sensitivity. In the case of a portable computer, this may cause the cursor to jump around on the screen and/or activation of processes that the user does not intend to activate. Because operation at the heightened sensitivity level may be accompanied by unwanted side effects, it may be desirable to operate the device at a heightened sensitivity level in cases where the device has a higher quality ground path available. While the device may already contain circuitry that enables it to determine whether it is plugged into an outlet, it may be more difficult for a device to determine whether it is being held by a user.

In order to operate the capacitive touch sensor at an optimal sensitivity level when the device is held by a user but not plugged into an outlet, there should be a way to for the device to determine whether or not it is being held by a user. A way to enable a device to make this determination is to consider input from an accelerometer that is coupled to the device. An accelerometer is typically a micro-electromechanical (MEM) device, or MEMS accelerometer that contains at least one accelerometer, inclinometer or gyroscope. The accelerometer may monitor changes in acceleration along three major axes, which means that it may be used to detect almost any motion sustained by a device. Accelerometers vary in the sensitivity of their target applications in that they are able to measure magnitude of acceleration on a scale of 0-1.5 g for a higher resolution application and 0-6 g (or more) in a lower resolution application. For a highly dynamic application, such as assisting in the operation of a vehicle, a lower resolution accelerometer may suffice. However, for the application considered herein, a higher resolution accelerometer, such as a 1.5 g Kionix KXP84 Series MEMS accelerometer may be ideal. An exemplary accelerometer contains a packaged sensor element and is designed to have a customizable sensitivity level in terms of the amount of motion or change in position that is required to cause the device to generate an interrupt signal. The interrupt signal may be generated for a change in acceleration on any axis above a predetermined threshold value when the device is programmed to detect motion, and may be generated for a change in acceleration on all three axes below a threshold value when the device is programmed to detect a freefall. It is noted that any such change in angular position or acceleration magnitude should be analyzed over a predetermined time period to allow the device to determine the extent of any motion sustained. Generally, the sensor element may function on the principle of differential capacitance by including a displaceable silicon structure that is displaced when the sensor is subject to acceleration. The displacement of the silicon structure may generate a change in capacitance when it undergoes acceleration, and the change in capacitance can be used to generate an output voltage that corresponds to the experienced acceleration.

By taking measurements as often as one hundred times per second, an accelerometer can detect even the slightest angular or linear movements. Accelerometers have been observed to detect a free-fall before a device has fallen three inches and are expected to become even more sophisticated as technologies advance. By equipping a device with an accelerometer, the device may be able to instantly determine whether it is at rest on a stationary surface, such as a table, or if it is undergoing minute changes in position as an indication that it is being supported by the body of the user. The accelerometer enables this determination by detecting movements in the body that are so small they would be difficult to perceive with the naked eye. In fact, the accelerometer is likely to provide a reading to the computer that will determine that it is being held even if a person holds an accelerometer equipped device as still as humanly possible. By using data gathered by one or more accelerometers, a capacitive touch screen device can invoke different sensitivity levels in its firmware depending on whether or not it is being held by a person.

It is noted that the device's sensitivity to input from an accelerometer may be a tunable feature. The amount of movement, or the ideal change in accelerometer data, required to generate a signal that will invoke a change in the sensitivity algorithm of the capacitive touch screen may be determined by observing changes in accelerometer data when the device is being held and when the device is stationary. Tuning may be necessary because particular accelerometers may vary in accuracy. The accuracy of the accelerometer may be affected by the amount of electrical noise present in the operating environment. By observing the device at various accelerometer sensitivity levels, a designer may be able to select threshold accelerometer readings that will reliably indicate that the device is being held by a user. By making such an observation, a designer may also limit the potential to implement the accelerometer at too high of a sensitivity level, which may cause the device to detect unreliable data related to the motion sustained by the device.

For devices that are not connected to a wall outlet, or similar path to ground through a power cord, the use of accelerometer data to invoke different sensitivity levels in firmware settings may improve the performance of the capacitive touch sensor. The capacitive sensor may operate according to the default sensitivity level and more effectively filter unwanted noise when the device is being held by taking advantage of the available higher quality return ground path. The computer may similarly determine if it is at rest on a table or similar stationary surface, and invoke a higher sensitivity algorithm necessary to more effectively detect touches when not sharing a ground path with a user. Thus, using information gathered from an accelerometer, a computer or similar device can use software to select and invoke different sensitivities for detecting capacitive couplings by intelligently determining the type of ground path that is most likely present.

Figure 2:
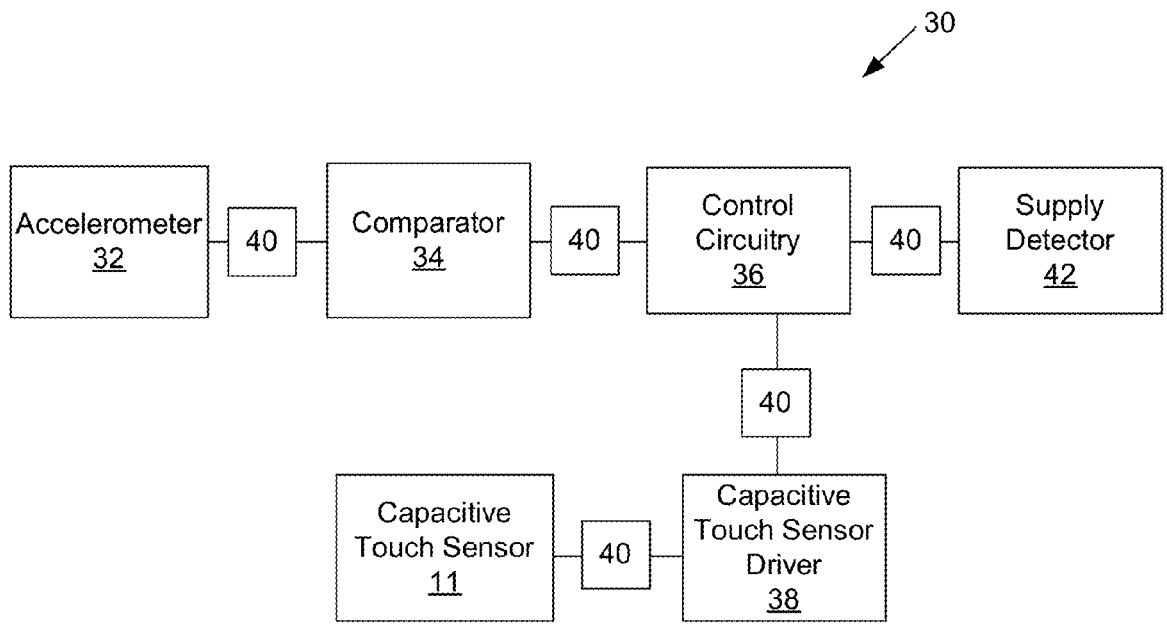
FIG. 2 is a block diagram showing a representative portion of a device capable of interpreting accelerometer data to determine a control algorithm.

FIG. 2 is a block diagram showing a representative portion of a capacitive touch screen device similar to device 10 pictured in FIG. 1 that is capable of interpreting accelerometer data to determine an optimal control algorithm for the capacitive touch sensor. Here, an electronic device 30 contains an accelerometer 32, a comparator 34, control circuitry 36, a power or ground supply detector 42, a capacitive touch sensor driver 38, and a capacitive touch sensor 11. Data corresponding to the movement of the device is gathered by accelerometer 32 and communicated to comparator 34. The comparator 34 compares the magnitude of the acceleration or other movement related data collected from the accelerometer 32 against a predetermined threshold to determine whether the device is at rest on a stationary surface or held by a user. The comparator result, which is effectively a determination of whether the device is supported by a user or a stationary surface, is communicated from the comparator 34 to control circuitry 36. In one embodiment, the control circuitry 36 may select a high or low sensitivity control algorithm based on the determination from the comparator 34, and implement a control algorithm via a capacitive touch screen driver 38. In another embodiment, the control circuitry 36 may select a high or low sensitivity control algorithm based on a determination made by the power or ground supply detector 42, which indicates whether the capacitive touch screen device is coupled to an alternating current (AC) power supply with a ground conductor In yet another embodiment, the control circuitry 36 may adjust the sensitivity control algorithm in response to motion detected by accelerometer 32 and comparator 34 and whether the device is coupled to a power and/or ground supply. It is noted that the aforementioned elements of FIG. 2 may be accomplished with various combinations of software and hardware. In particular, to the extent the elements may comprise discreet components rather than software functions, the devices may be connected by a series of buses 40 that accomplishes the needed functionality. For example, the accelerometer 32 may be connected to a controller or other chipset via a system management bus, which may in turn be connected to another chipset via a low pin count bus, and so on. Further, the control circuitry 36 and comparator 34 may comprise an embedded controller, a southbridge, a northbridge, a processor, and associated buses.

Figure 3:
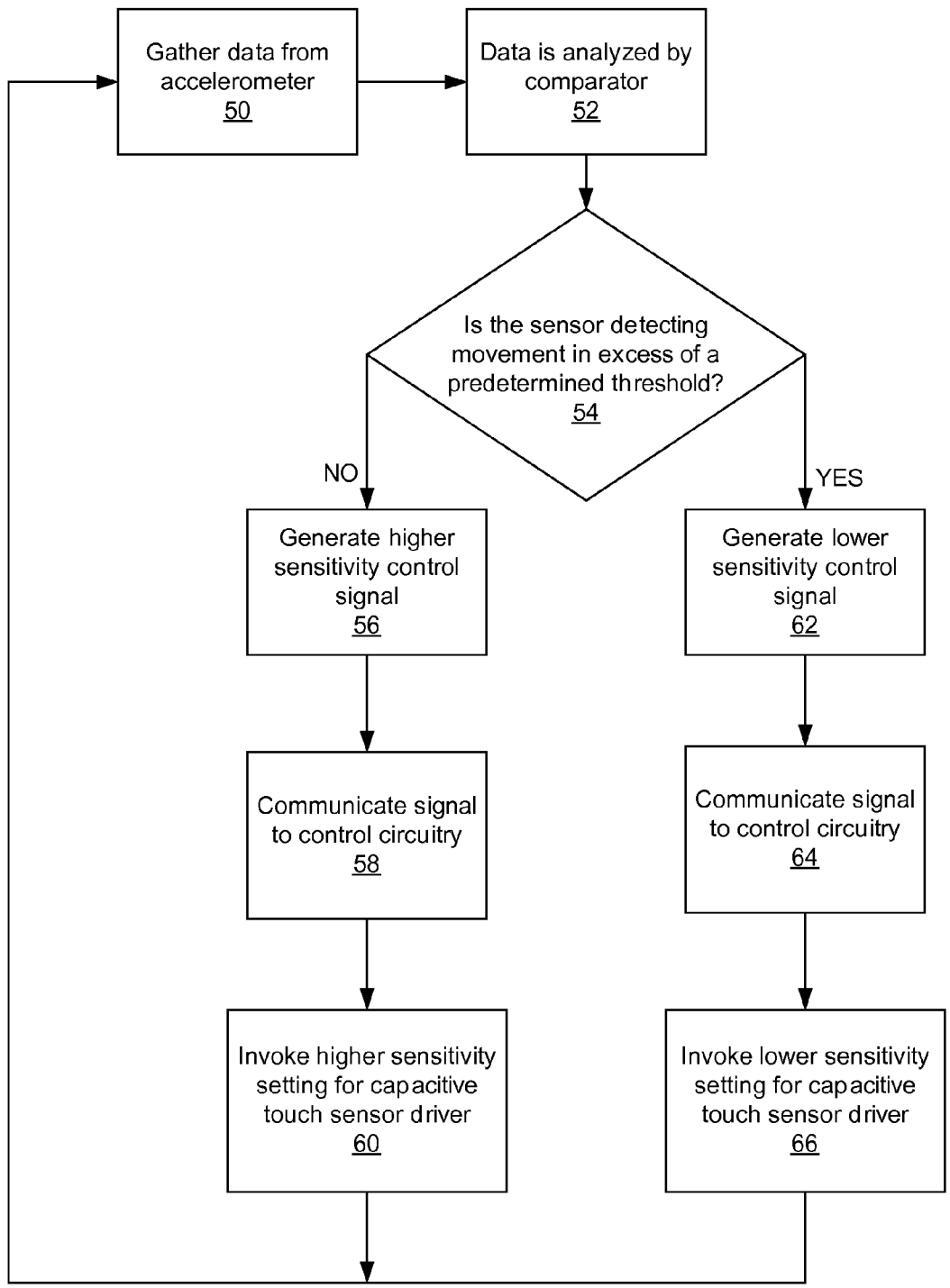
FIG. 3 is a flowchart showing a method for operating a device with capacitive touch sensors based on data that is gathered from an accelerometer.

FIG. 3 is a flowchart showing an exemplary method for adjusting the sensitivity of a capacitive touch sensor based on data that is gathered from an accelerometer. The method is intended to enable a device to determine whether or not it is being held by a user when it is not connected to a grounded power source, such as a wall outlet. First, an accelerometer is used to gather data 50. The gathered data is analyzed by a comparator function 52 to determine whether the device is being held by the user. The comparator determines whether the signal received from the sensor indicates a position change that exceeds a predetermined threshold in orientation or magnitude of acceleration 54. For instance, the predetermined threshold may be 1.5 degrees of rotation about any axis or a pre-selected change in the magnitude of acceleration, for example, greater than 5% or 0.15 g, in any direction over a predetermined amount of time. If the position change is not greater than the predetermined threshold, then the comparator may generate a heightened sensitivity signal 56. This signal is propagated to the control circuitry of the electronic device 58, which may then interface with the touch sensor driver to implement the higher sensitivity setting 60. If the position change is greater than the predetermined threshold, then the comparator may generate a lower (default) sensitivity signal 62. This default signal may then propagate to the control circuitry 64, which may then interface with the touch sensor driver to implement the lower (default) sensitivity setting 66. Accordingly, the capacitive touch sensor may operate according to the default (lower) sensitivity algorithm and take advantage of the higher quality ground path that is made available through contact with the user when the device is supported by the user. This in turn may allow for more stable operation of the device because it will not operate at an unnecessarily heightened sensitivity level that is required to operate in the absence of a higher quality return path ground. If, however, data collected from the accelerometer indicates that the device is not being held by a user, then the controller may direct the capacitive touch sensor to operate according to the more sensitive algorithm 60 which may cause the touch sensor to retain its functionality in the absence of the higher quality return path ground. Since the location of the device could change at any time, the process repeats itself periodically (e.g., multiple times per second) so that the sensitivity of the touch sensor may promptly adjust when the device is either picked up or set down by the user.

It is noted that, for the sake of simplicity, the process disclosed herein for determining if the device is being held by a user involves a relatively simple determination of whether the movement pattern device has undergone a pre-selected amount of change within a given amount of time. However, it is noted that the data gathered by the accelerometer may be analyzed in a more complex fashion to determine whether or not the device is held by a user.

Also, while the determination of whether the device is supported by the body of the user may be very useful in implementing a sensitivity algorithm for a capacitive touch screen device, such a determination may also be useful for implementing other device controls as well. For instance, both security and power management related control processes may be improved by considering input from an accelerometer. This is because the determination of whether or not the device is supported by the body of the user may be indicative of whether the device is in use or has been set down by a user when the device is not plugged in via its power cord or a docking station. While security and power management controls will likely consider other input, such as how long the device has been inactive and which processes the device is performing, input from an accelerometer may also help to make a reliable determination of whether or not an electronic device is in use. Such a consideration may be made by incorporating a process similar to the process outlined in FIG. 3 into processes that control the implementation of security measures and/or power management settings. As such, security measures and/or power conservation measures may be triggered if input from an accelerometer indicates that the device is not in use. For instance, a device may require the user to enter a password, scan their fingerprint, verify their signature, or otherwise authenticate their identity after the device determines that it has been set down for an extended period of time. With respect to power management, the device may dim its display, cut power to antennae or other internal components, or invoke other measures to reduce power consumption. In short, security, power management, and other processes executed by an electronic device may also be improved by analyzing data gathered from an accelerometer.

It will be appreciated to those skilled in the art having the benefit of this disclosure that this invention is believed to provide a method for improving sensitivity on capacitive touch screens. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An electronic device configured to receive input from a user in the form of a user initiated touching of the electronic device, wherein the touching of the electronic device creates a capacitive coupling between the user and the electronic device, and wherein the electronic device comprises:
   a display screen;
   a capacitive touch sensor incorporated within the display screen for detecting the user initiated touching of the electronic device by detecting the capacitive coupling between the user and the capacitive touch sensor;
   at least one sensor operable to collect data corresponding to motion of the electronic device; and
   control circuitry operable to adjust a sensitivity of the capacitive touch sensor to the user initiated touching depending on the data collected by the at least one sensor, wherein the control circuitry comprises an algorithm for lowering the sensitivity of the capacitive touch sensor to a default sensitivity level when the at least one sensor detects motion of the electronic device that is greater than or equal to a predetermined amount, and increasing the sensitivity of the capacitive touch sensor to a higher sensitivity level when the at least one sensor detects motion of the electronic device that is below the predetermined amount.

2. The electronic device of claim 1, wherein the at least one sensor comprises an accelerometer.

3. The electronic device of claim 1, further comprising a detector for determining whether the electronic device is coupled to an alternating current (AC) power supply with a ground conductor.

4. The electronic device of claim 1, wherein the control circuitry is operable to adjust the sensitivity of the capacitive touch sensor in response to motion experienced by the electronic device and whether the electronic device is connected to a ground supply.

5. The electronic device of claim 1, wherein the electronic device is a computer.

6. The electronic device of claim 1, wherein the capacitive touch sensor is coupled to the display for detecting a position of a pointing device relative to an XY plane parallel to a surface of the display, and wherein the control circuitry is coupled to a driver for adjusting a sensitivity of the capacitive touch sensor to accurately detect the position of the pointing device.

7. The electronic device of claim 1, wherein the at least one sensor comprises a gyroscope.

8. A method for selecting a control algorithm for setting a sensitivity of a capacitive touch screen device, the method comprising:
   determining whether the capacitive touch screen device is abutting the body of a user or connected to a ground supply; and
   selecting a control algorithm for setting a sensitivity of a capacitive touch sensor included within the capacitive touch screen device based on said determination, wherein
   the step of selecting a control algorithm comprises:
   implementing a first control algorithm if the device is determined to be abutting and supported by the body of the user or connected to the ground supply, wherein the first control algorithm lowers or maintains the sensitivity of the capacitive touch sensor at a default sensitivity level; and
   implementing a second control algorithm if the device is not determined to be abutting and supported by the body of the user or connected to the ground supply, wherein the second control algorithm increases the sensitivity of the capacitive touch sensor to a sensitivity level higher than the default sensitivity level.

9. The method of claim 8, wherein said determining comprises:
   receiving data from a first sensor for detecting movement of the capacitive touch screen device above a predetermined value; and
   receiving data from a second sensor for detecting whether the capacitive touch screen device is coupled to a ground supply.

10. The method of claim 9, wherein the step of receiving data from the first sensor comprises receiving data from an accelerometer coupled to the capacitive touch screen device.

11. The method of claim 8, wherein the step of determining whether the device is abutting the body of the user or connected to a ground supply comprises receiving data from a sensor coupled for detecting movement of the capacitive touch screen device, wherein the data comprises a change in position of the capacitive touch screen device, and wherein the step of determining determines that the device is abutting the body of the user if the change in position is greater than a predetermined value.

12. A system incorporated within a portable computing device for reducing the effect of electronic noise on a control mechanism for an electronic display of the personal computing device, the system comprising:
- a first sensor that is operable to detect movement of the personal computing device;
- a second sensor that is operable to detect whether the personal computing device is coupled to a ground supply;
- a first control mechanism for inputting data to the personal computing device by creating a capacitive coupling between an object and the electronic display of the personal computing device; and
- a second control mechanism for adjusting a sensitivity of the first control mechanism based on input received from the first sensor and the second sensor, wherein the second control mechanism comprises an algorithm for lowering the sensitivity of the first control mechanism to a default sensitivity level when the first sensor detects movement of the personal computing device that is greater than or equal to a predetermined amount, and increasing the sensitivity of the first control mechanism to a higher sensitivity level when the first sensor detects movement of the personal computing device that is below the predetermined amount.

13. The system of claim 12, wherein the object comprises a stylus or an appendage of a user.

14. The system of claim 12, wherein the electronic display is a capacitive touch-screen display.

15. The system of claim 12, wherein the first sensor is an accelerometer.

16. The system of claim 12, wherein the second control mechanism comprises an algorithm for lowering or maintaining the sensitivity of the first control mechanism at a default sensitivity level when the second sensor detects the personal computing device as being coupled to the ground supply, and increasing the sensitivity of the first control mechanism to a higher sensitivity level when the second sensor detects the personal computing device as being disconnected from the ground supply.

17. The system of claim 12, wherein the first sensor comprises a gyroscope.

* * * * *